June 4, 1929.  J. B. CLAY  1,715,493
COMBINATION GATE AND TROUGH
Filed July 9, 1923   2 Sheets-Sheet 1
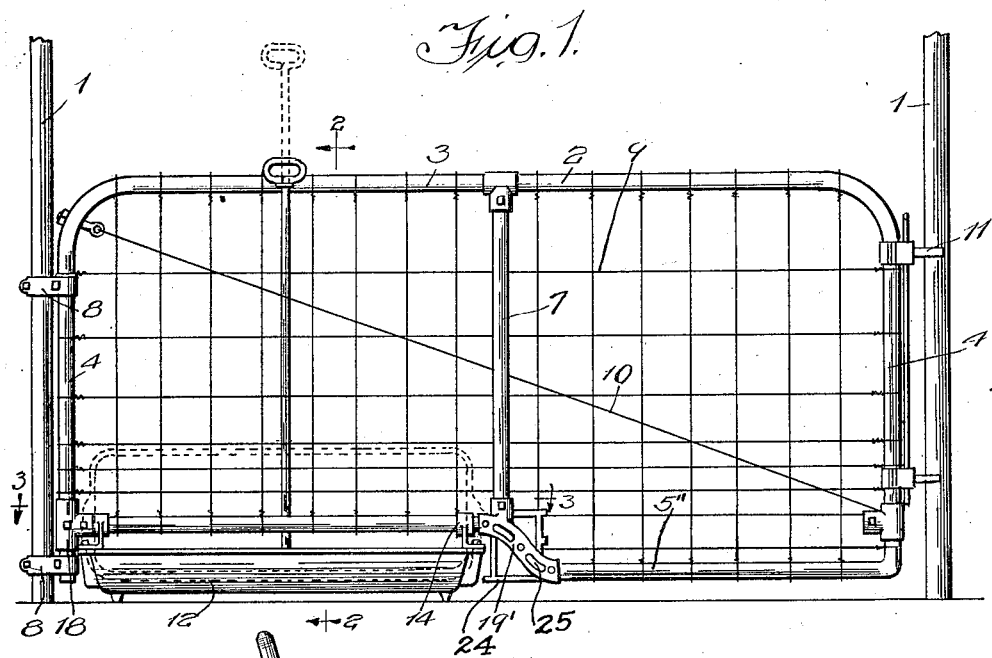
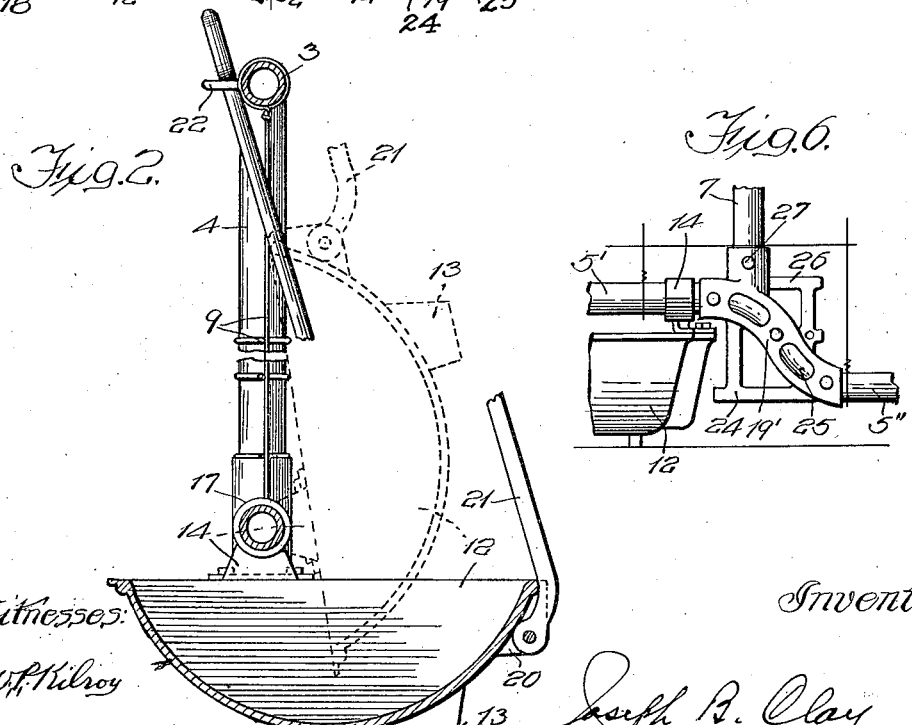
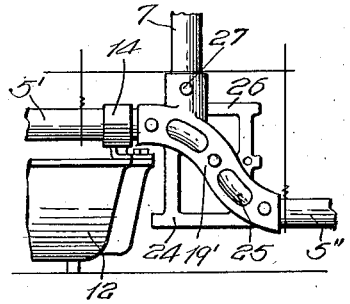

June 4, 1929.  J. B. CLAY  1,715,493
COMBINATION GATE AND TROUGH
Filed July 9, 1923   2 Sheets-Sheet 2
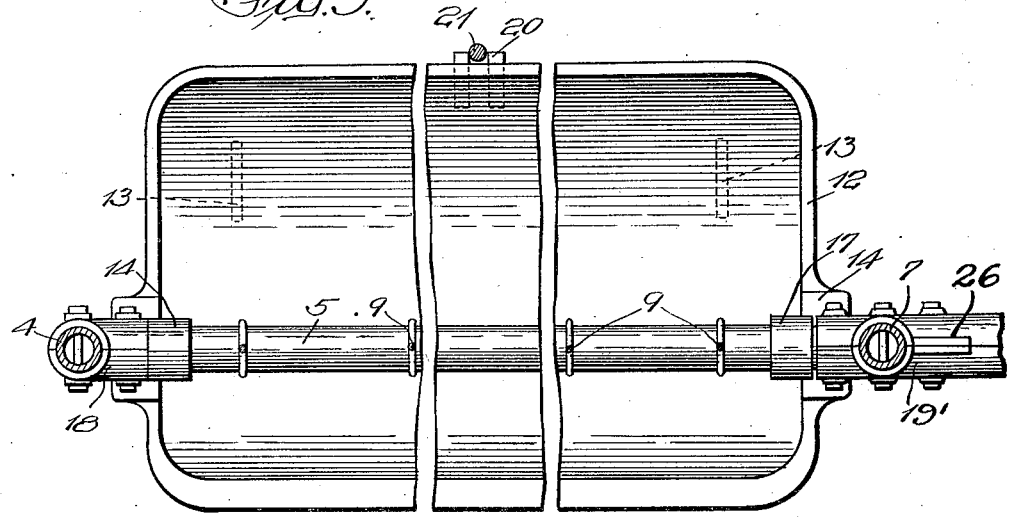
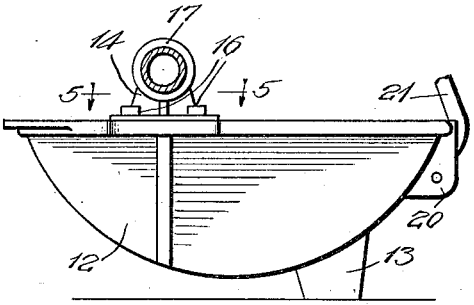 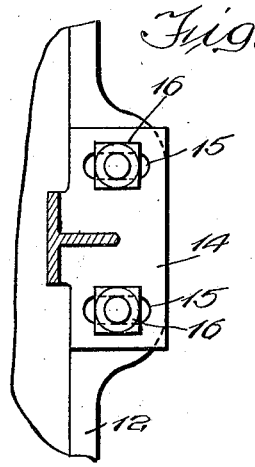

Patented June 4, 1929.

1,715,493

UNITED STATES PATENT OFFICE.

JOSEPH B. CLAY, OF CEDAR FALLS, IOWA.

COMBINATION GATE AND TROUGH.

Application filed July 9, 1923. Serial No. 650,470

My invention relates to an improvement in a combined gate and trough, and more particularly to a front gate adapted to be used in pen structures, and having the trough pivoted thereto and carried thereby.

Some of the objects of my invention are to provide a device of the kind described, which shall be neat and attractive in appearance, simple, convenient, compact, durable, reliable, efficient and satisfactory for use wherever found applicable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claim.

In the drawings, wherein like reference characters indicate like or corresponding parts:

Fig. 1 is a front elevation of the combined front gate and trough mounted in place on the pen structure;

Fig. 2 is a section taken substantially on the line 2—2 of Fig. 1;

Fig. 3 is a section taken substantially on the line 3—3 of Fig. 1;

Fig. 4 is a side elevation of the trough in operative position;

Fig. 5 is a section taken substantially on the line 5—5 of Fig. 4; and

Fig. 6 is a detail view on an enlarged scale of a portion of the structure shown in Fig. 1.

In the drawings, wherein I have illustrated the preferred embodiment of my invention, 1 represents the vertical side posts of the pen and upon one of which is adapted to be mounted the swinging front gate 2.

The gate is preferably made of tubing of a suitable size and strength, preferably of metal, and comprises a horizontal top member or bar 3, vertical side members or bars 4 and a connecting bar 5 at the lower ends of the bars 4. The bar 5 connecting the vertical bars 4 is bent intermediate its ends as at 25, and thus comprises two parallel portions 5' and 5'', as shown clearly in Fig. 6. A central bar 7 is arranged parallel to and intermediate the bars 4, and is connected at its upper end to the bar 3 and at its lower end to the bar 5. Castings 19' engage the bar 7 and the lower bar of the gate on opposite sides, and bolts 27 are used for holding the castings in place and securing the bars together. Fillers 24 and 26 may be arranged to extend or project from the castings in opposite directions so as to prevent the passage of stock therethrough.

The gate is hinged along one vertical edge to the vertical support 1 by means of hinge-brackets 8, or the like, the lower hinge-bracket being secured to the free lower end of the bar 4. Wires 9 are arranged vertically and transversely of the gate so as to prevent the passage of stock therethrough, and if desired, a reinforcing brace 10 may be arranged diagonally of the gate, as shown. Latches 11 may be arranged at the unhinged end of the gate so as to engage the upright 1 and detachably hold the gate in the desired position.

It will be noted that by means of the peculiar construction of the bar 5 across the lower end of the gate a recess or opening is formed therebelow to one side of the center of the gate and into this recess is adapted to be positioned a feeding trough 12, this trough to be carried by the gate. This feeding trough may be of any desired size, shape or material, preferably of cast-iron, and having legs 13 adjacent one side edge thereof.

The upper bar 5' of the lower pair of bars is preferably made of one solid piece and extends between the parallel members 4 and supports the entire weight of the trough, while the lower bar 5'' serves as a brace and prevents some of the stock, as for instance the little pigs, from crowding through the gate.

Trough hangers 14 are secured to the opposite ends of the trough, as shown, said hangers comprising a portion having elongated openings 15 therethrough to adjustably receive bolts 16, whereby the hangers may be adjustably secured in place, and a sleeve portion 17 adapted to encircle the supporting bar 5, as shown, so that the trough may be swung about the bar 5 as a horizontal axis.

In order to limit the movement of the trough longitudinally of the bar 5, a substantially T-shaped fitting 18 is mounted on one of the bars 4 which serves as a bearing, the bracket 19' serving as a bearing at the opposite end of the trough.

The pivotal axis of the trough is arranged substantially parallel to and offset from the axis of symmetry of the trough so as to permit the swinging of the trough to its inoperative position without striking the trough on the floor, and yet permit of the outside filling of said trough when in feeding position. The inner edge of said trough is provided with ears or the like 20, and one end of an operating arm or rod 21 is pivotally secured thereat, the other end of said operating arm extending forwardly and upwardly of its pivoted end to frictionally and slidably engage an eye 22 carried at the upper bar 3 of the gate, as shown more clearly in Figs. 1-2.

When in the position shown in full lines in Fig. 2, the trough is in position for feeding and may be filled from the outside of the pen, while the feeding is carried on. When the trough is moved to the dotted line position, shown in said figure, by pulling up the rod 21, it lies closely adjacent the inner side of the gate out of contact with the floor of the pen, and may be easily cleaned in such position.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

In a device of the kind described and in combination, a gate having a top bar bent downwardly at its ends to provide vertical side bars, a brace bar spaced intermediate of and parallel to said side bars and connected at one end to said top bar and extending downwardly therefrom, and a bottom bar connected at its ends to the lower ends of said side bars, said bottom bar bent downwardly in a smooth curve intermediate its ends so that the portion of the bottom bar between said bend and one of the side bars is at a higher elevation than the portion between said bend and the other side bar, and means having a position conforming to said bent portion for connecting said brace bar to said lower bar at said bend.

In testimony whereof, I have hereunto signed my name.

JOSEPH B. CLAY.